United States Patent [19]

Fujii et al.

[11] Patent Number: 5,707,478

[45] Date of Patent: Jan. 13, 1998

[54] METHOD FOR PRODUCING THERMOPLASTIC RESIN SHEET OR FILM

[75] Inventors: Atsushi Fujii; Akira Funaki; Tohru Yukumoto, all of Himeji, Japan

[73] Assignee: Idemitsu Petrochemical Co., Ltd., Tokyo, Japan

[21] Appl. No.: 523,758

[22] Filed: Sep. 5, 1995

Related U.S. Application Data

[63] Continuation-in-part of Ser. No. 405,440, Mar. 16, 1995, abandoned, which is a continuation of Ser. No. 199,087, Feb. 22, 1994, abandoned.

[30] Foreign Application Priority Data

Feb. 25, 1993 [JP] Japan ................... 5-059420

[51] Int. Cl.$^6$ ............... B29C 59/04; B32B 31/20
[52] U.S. Cl. ............ 156/324; 156/309.9; 156/322; 156/583.5; 264/284
[58] Field of Search ............. 156/583.5, 309.9, 156/322, 324, 243; 264/284, 288.4, 290.2, 235.6, 235.8

[56] References Cited

U.S. PATENT DOCUMENTS

| | | | |
|---|---|---|---|
| 2,082,895 | 6/1937 | Knowland | 264/288.4 |
| 2,442,598 | 6/1948 | Harrison et al. | |
| 2,451,597 | 10/1948 | Wheeler | |
| 2,567,275 | 9/1951 | Colombo | 264/284 |
| 2,585,915 | 2/1952 | Chavannes | 264/284 |
| 2,642,625 | 6/1953 | Peck | 264/288.4 |
| 2,970,345 | 2/1961 | Wangner | 264/284 |
| 3,758,649 | 9/1973 | Frattarola | 264/220 |
| 3,882,207 | 5/1975 | Hannan | 264/284 |

(List continued on next page.)

FOREIGN PATENT DOCUMENTS

| | | |
|---|---|---|
| 0 352 241 | 1/1990 | European Pat. Off. |
| 496260 | 7/1992 | European Pat. Off. |
| 2 167 876 | 8/1972 | France |
| 60-236719 | 11/1985 | Japan |
| 61-24977 | 6/1986 | Japan |
| 61-32572 | 7/1986 | Japan |

(List continued on next page.)

OTHER PUBLICATIONS

Japanese Patent Abstract of JP 1-204, 716, Nov. 14, 1989, vol. 13, No. 506 (M-892) (3854).

Japanese Patent Abstract of JP 56-621122, Aug. 8, 1981, vol. 5, No. 123 (M-82) (795).

Japanese Patent Abstract of JP 63-60726, Aug. 3, 1988, vol. 12, No. 282 (M-726) (3129).

*Primary Examiner*—Daniel Stemmer
*Attorney, Agent, or Firm*—Frishauf, Holtz, Goodman, Langer & Chick, P.C.

[57] ABSTRACT

A method is provided for producing a thermoplastic resin sheet or film by hot-melting and then cooling a thermoplastic resin to form a sheet or film. The thermoplastic resin sheet or film is moved so that it is pressed against the outer surface of an external heated roll and against a heated, endless metal belt. The endless metal belt is disposed at one end around a moving, internal heating roll and at an opposite end thereof around a moving, internal cooling roll. The internal heating roll heats the endless metal belt to a temperature higher than the softening point of the thermoplastic resin and higher than the temperature of the external heating roll to thermally adhere the thermoplastic resin sheet or film to the external heated roll or the heated, endless metal belt. The thermoplastic resin sheet or film is then moved along on the external heated roll or belt into a high temperature zone. The thermoplastic resin sheet or film is then released from the contact with the external heated roll and released from contact with the endless metal belt in a low temperature zone. The thermoplastic resin sheet or film is then peeled from the endless metal belt. Methods are also provided for producing a laminate of two or more thermoplastic resin sheets or films. The above methods provide non-stretched thermoplastic resin sheets, films or laminates with high-quality surfaces, which are suitable for wrapping foods and medicines.

21 Claims, 3 Drawing Sheets

U.S. PATENT DOCUMENTS

| | | |
|---|---|---|
| 3,994,765 | 11/1976 | Brinkmann et al. . |
| 3,997,386 | 12/1976 | Oshida .................... 156/309.9 |
| 4,049,589 | 9/1977 | Sakane . |
| 4,193,959 | 3/1980 | Lemelson . |
| 4,289,559 | 9/1981 | Murphy .................... 156/583.5 |
| 4,548,778 | 10/1985 | Fujii . |
| 4,681,723 | 7/1987 | Jester .................... 264/237 |
| 4,826,555 | 5/1989 | Long . |
| 5,026,778 | 6/1991 | Fujii et al. . |
| 5,084,519 | 1/1992 | Ishibashi . |
| 5,091,133 | 2/1992 | Kobayashi .................... 264/288.4 |
| 5,169,583 | 12/1992 | Moriguchi et al. . |
| 5,204,037 | 4/1993 | Fujii . |
| 5,211,899 | 5/1993 | Fujii . |
| 5,283,017 | 2/1994 | Rohleder .................... 156/324 |

FOREIGN PATENT DOCUMENTS

| | | |
|---|---|---|
| 62-42822 | 2/1987 | Japan . |
| 62-10816 | 3/1987 | Japan . |
| 62-41457 | 9/1987 | Japan . |
| 62-284719 | 12/1987 | Japan . |
| 4312848 | 11/1992 | Japan .................... 156/583.5 |
| 661804 | 8/1987 | Switzerland . |

METHOD FOR PRODUCING THERMOPLASTIC RESIN SHEET OR FILM

This application is a Continuation-in-Part, of application Ser. No. 08/405,440, filed Mar. 16, 1995, (now abandoned) which is a continuation of application Ser. No. 08/199,087 filed Feb. 22, 1994 (now abandoned).

FIELD OF THE INVENTION

The present invention relates to a method for efficiently producing a non-stretched sheet or film of a thermoplastic resin by a simple operation, the surface of which is smoothed (glazed) or embossed by high-quality treatment. The sheet or film to be produced by the present invention is favorably used in the field of wrapping materials for foods and medicines.

BACKGROUND OF THE INVENTION

It is desired that thermoplastic resin sheets and films to be used for wrapping foods and medicines are highly transparent. The present applicant has heretofore proposed various techniques of controlling crystallization of crystalline thermoplastic resins by rapidly cooling them, as methods for improving the transparency of sheets or films of crystalline thermoplastic resins (e.g., Japanese Patent Publication Nos. 62-41457 and 62-10816) and has already put them into practical use.

Recently, however, further improvement in the quality of sheet products and also in the productivity of them has been desired. For this, for example, glazing (smoothing) or embossing (patterning) of the surfaces of sheets or films made of thermoplastic resins, as the surface treatment of them, has been carried out in this technical field. The post-treatment of the kind may be conducted, using roll-combined devices.

However, in order to treat the surfaces of sheets or films made of thermoplastic resins by rapid, high-quality surface treatment (for example, by rapid, high-quality surface smoothing or precision embossing), complicated devices such as multi-staged rolls are needed. In addition, the surface treatment has the following problems.

For example, glazing (smoothing) with pressure rolls is possible, by which, however, the sheets treated are oriented only in the MD direction so that their physical properties could not be well-balanced.

Embossing (patterning) with pressure rolls is accompanied by a problem that the embossing accuracy is lowered when the treatment is conducted at high speeds.

On the other hand, the application of a double-belt pressing technique, as one of pressing techniques, to the surface treatment or lamination of thermoplastic resin sheets is extremely effective, but this is accompanied by a problem that the devices for the treatment are large-scaled, complicated and expensive.

SUMMARY OF THE INVENTION

The present invention overcomes the above-mentioned problems in the prior art and to provide a method for efficiently producing a non-stretched, thermoplastic resin sheet or film by simple operation, the surface of which is treated by high-quality and high-grade treatment of the invention.

First, the present invention provides a method for producing a thermoplastic resin sheet or film, in which a thermoplastic resin is hot-melted and then cooled to produce a thermoplastic resin sheet or film. The thermoplastic resin sheet or film is pressed against the outer surface of a heated roll or a heated, endless metal belt, adhered thereto under heat and moved along with the roll or belt. The thermoplastic resin sheet or film is then inserted and pressed between the outer surface of the roll and the outer surface of the endless metal belt, and thereafter it is released from the contact with the roll and then from contact with the endless metal belt and is removed therefrom.

Secondly, the present invention provides a method for producing a laminate sheet or film of thermoplastic resins using two kinds of thermoplastic resin sheets or films, each obtained by hot-melting a thermoplastic resin and then cooling it, in which one of the thermoplastic resin sheets or films is pressed against and adhered under heat to the outer surface of a heated roll, while the other thermoplastic resin sheet or film is pressed against and adhered to the outer surface of a heated, endless metal belt. Both of the thermoplastic resin sheets or films are moved along with the roll and the belt. Both of the thermoplastic resin sheets or films are then inserted and pressed together between the outer surface of the roll and the outer surface of the endless metal belt, and thereafter the resulting laminate is released from the contact with the roll and then from contact with the endless metal belt and is removed therefrom.

Thirdly, the present invention provides a method for producing a laminate sheet or film of thermoplastic resins using thermoplastic resin sheets or films of three kinds or more each obtained by hot-melting a thermoplastic resin and then cooling it. One of the thermoplastic resin sheets or films is pressed against and adhered under heat to the outer surface of a heated roll while another of the thermoplastic resin sheets or films is pressed against and adhered to the outer surface of a heated, endless metal belt. Both of the aforesaid thermoplastic resin sheets or films are moved along with the roll and the belt while the last one or the remaining ones of the thermoplastic resin sheets or films is/are inserted between the previous two thermoplastic resin sheets or films. Then all these thermoplastic resin sheets or films are pressed together between the outer surface of the roll and the outer surface of the endless metal belt, and thereafter the resulting laminate is released from the contact with the roll and then from contact with the endless metal belt and is removed therefrom.

BRIEF EXPLANATION OF THE DRAWINGS

In the drawings, 1 is a letting-off roll, 1' is another letting-off roll, 1" is still another letting-off roll, 2 is an untreated sheet, 2' is another untreated sheet, 2" is still another untreated sheet, 3 is a pressure roll, 3' is another pressure roll, 3" is still another pressure roll, 4 is a hot roll, 5 is an endless metal belt, 6 is an inside heating roll, 7 is a cooling roll, 8 is a backup roll, 9 is a cooling pressure roll, and 10 is a take-up roll.

DETAILED DESCRIPTION OF THE INVENTION

Figure 1:
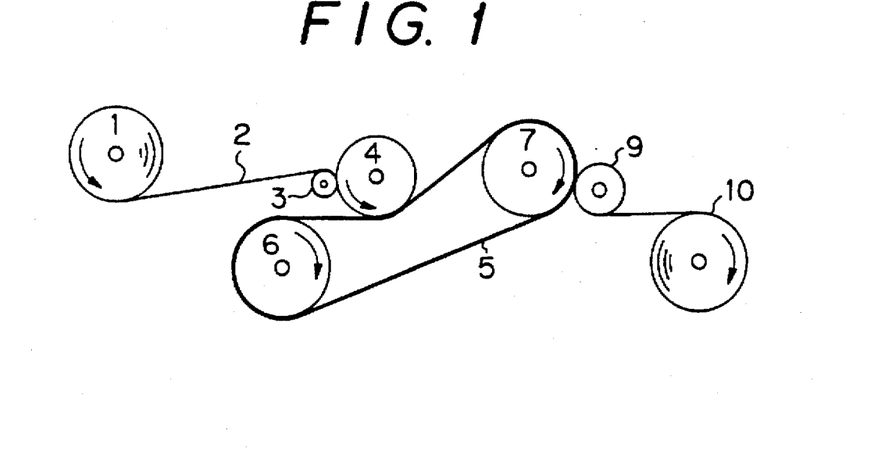
FIG. 1 is a schematic view showing the first embodiment of the device to be used in carrying out the first method of the present invention.
Figure 2:
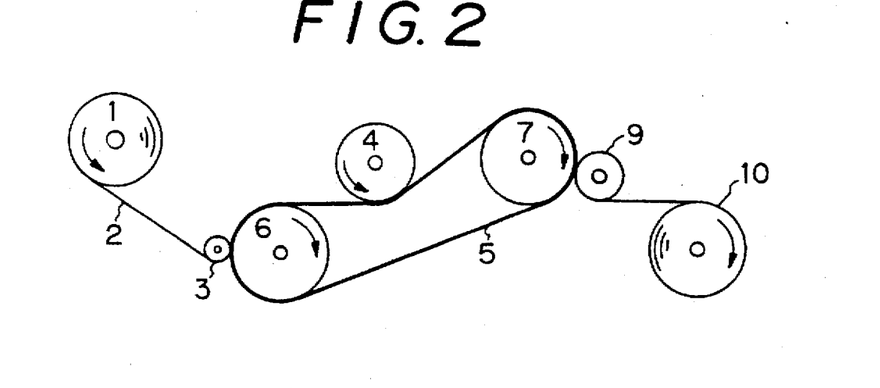
FIG. 2 is a schematic view showing the second embodiment of the device to be used in carrying out the first method of the present invention.
Figure 3:
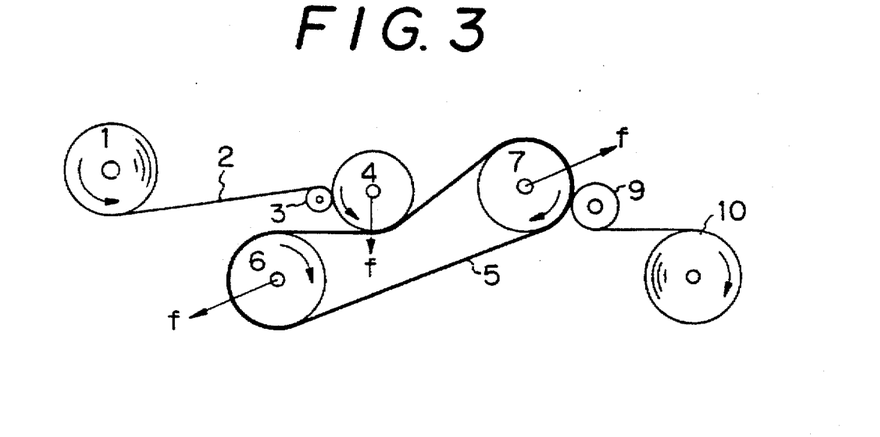
FIG. 3 is a schematic view showing the third embodiment of the device to be used in carrying out the first method of the present invention.

The methods of the present invention will be explained hereunder, with reference to the drawings. FIG. 1 is a schematic view showing the first embodiment of the device to be used in carrying out the first method of the present invention. FIG. 1 illustrates one embodiment of pressing a thermoplastic resin sheet or film that has been obtained by hot-melting and cooling a thermoplastic resin against the outer surface of a heated roll by the aid of a rubber roll so as to make the sheet or film adhere to the outer surface under heat to thereby heat the sheet or film with the heated roll. Instead of this, the thermoplastic resin sheet or film may also be pressed and adhered under heat to the outer surface of a heated, endless metal belt, as illustrated in FIG. 2.

In the first method of the present invention, in general, a thermoplastic resin sheet or film (this may be hereinafter referred to as an untreated sheet 2) that has been wound around a letting-off roll 1 is used as the sheet or film to be treated. However, such off-line treatment is not limitative, but in-line treatment may also be employed where a sheet or film is, immediately after having been formed, fed directly to the process line.

The thermoplastic resin to be used as the raw material for the sheet or film in the first method of the present invention is not specifically limited. For example, not only crystalline resins such as polyethylene, polypropylene, polyethylene terephthalate, etc. but also non-crystalline or amorphous resins such as polystyrene, polycarbonate, polyvinyl chloride, polymethyl methacrylate, etc. may be employed. However, the present invention is extremely effective for crystalline resins which are difficult to form highly-transparent products, especially polypropylenes (including propylene homopolymers, crystalline propylene copolymers comprising one or more comonomers, their mixtures) and is therefore favorably applied thereto.

Where a thermoplastic resin sheet or film with low internal haze is used as the untreated sheet or film to be treated by this method, the finally obtained sheet or film will have a high transparency and a high quality. For crystalline resins which are difficult to lower their internal haze, especially polypropylenes, their internal haze may be lowered by rapidly cooling them or by incorporating a nulceating agent or a petroleum resin thereinto so as to make their crystal structures finely-crystalline or convert them into amorphous ones.

The thickness of the sheet or film to be obtained in the present invention is generally from 0.1 to 2 mm, preferably from 0.2 to 1.0 mm.

In accordance with the method of the present invention, in general, the thermoplastic resin or sheet (namely, the untreated sheet 2) that has been wound around the letting-off roll 1 is unreeled, and this is pressed against the outer surface of a heated roll 4 (this may be hereinafter referred to as a hot roll) or against the outer surface of a heated, endless metal belt 5, adhered thereto under heat and moved along with it while heating.

In this step, the hot roll 4 and the endless metal belt 5 are kept heated, and their temperatures are such that the thermoplastic resin sheet or film 2 (namely, the untreated sheet 2) may be at temperatures falling between its softening point and its melting point, preferably between 120° C. and 350° C. For amorphous resins not having a definit melting point, the temperatures may be not lower than their softening point and the upper limit of the heating temperatures is not specifically defined. If the temperatures of the hot roll 4 and the endless metal belt 5 are lower than the softening point of the resins, the glazing or embossing will be finished poor or the adhesion strength of the laminated thermoplastic resin sheet or film 2 will be lowered. On the other hand, if the temperatures of the hot roll 4 and the endless metal belt 5 are higher than the softening point of the resins, the thermoplastic resin sheet or film 2 will fuse of stick to the hot roll 4 or the endless metal belt 5 or banks will be formed to give bank marks to the surface of the thermoplastic resin sheet or film 2. For crystalline resin sheets, such high temperatures are not favorable, as accelerating the crystallization of the resins increase the internal haze of the sheets.

In carrying out the first method of the present invention, it is necessary that the thermoplastic resin sheet or film 2 (namely, the untreated sheet 2) is pressed against and adhered to the outer surface of the hot roll 4 or the outer surface of the heated, endless metal belt 5 and that the former is moved along with the latter. In other words, it is necessary that the former is pressed against and adhered to the latter and is moved along with the latter in such a way that no air exists between the thermoplastic resin sheet or film 2 and the outer surface of the hot roll 4 or that of the heated, endless metal belt 5. For this, it is preferred to employ a pressure roll 3 made of an elastic material, as shown in FIG. 1. As the pressing means, any others may be employed but the best is to employ the pressure roll 3 made of an elastic material such as silicon rubber or fluorine rubber so as to press the sheet or film 2 against the outer surface of the roll 4 or the belt 5.

If the thermoplastic resin sheet or film 2 is heated too rapidly with the hot roll 4 or the endless metal belt 5, the sheet or film 2 will be expanded too rapidly so that it will be lifted up from the surface of the roll or the belt. In order to evade the trouble, it is preferred to pro-heat the sheet or film 2 at temperatures of approximately from 70° to 80° C., as will be mentioned hereinafter. The pro-heating may be effected, for example, by means of a pre-heating roll (not shown) prior to the contact of the sheet or film 2 with the hot roll 4 or the endless metal belt 5.

In accordance with the first method of the present invention, since the thermoplastic resin sheet or film 2 (namely, the untreated sheet 2) is moved while being pressed against and adhered to the outer surface of the heated hot roll 4 or that of the heated, endless metal belt 5, the surface of the sheet or film 2 is heated during the movement by means of the hot roll 4 and the endless metal belt 5.

As the hot roll 4, any materials with high thermal conductivity, such as metals, may be employed. It is desired that the diameter of the roll 4 is larger in view of the durability of itself. In practice, however, the diameter is suitably within the range of approximately from 100 to 1000 mm.

On the other hand, as the endless metal belt 5, usable are stainless steels, carbon steels and titanium alloys. Of these, preferred are stainless steels.

In general, the endless metal belt 5 has a thickness of approximately from 0.4 to 1.0 mm. The endless metal belt 5 of this kind is run generally at a relatively high speed of from 10 to 40 m/min.

The endless metal belt 5 is kept heated with the inside heating roll 6 or, if desired, with any other rolls located in the inside region surrounded by the belt or outside heaters (all not shown) that are kept heated.

The temperatures of the hot roll 4 and the endless metal belt 5 vary, depending on the kind of the resin employed, the thickness of the resin sheet or film being treated and the treating speed. However, they are defined such that the temperature of the thermoplastic resin sheet or film 2 (namely, the untreated sheet 2) may fall between the softening point of the sheet or film 2 and the melting point of the same, as mentioned above.

The untreated sheet 2 that has been kept pressed against and adhered to the hot roll or the endless metal belt 5 under heat in the manner mentioned above is inserted between the outer surface of the hot roll 4 and the outer surface of the endless metal belt 5 whereby it is again pressed therebetween. Namely, the heated, untreated sheet 2 is inserted between the the outer surface of the hot roll 4 and the outer surface of the endless metal belt 5, whereby the sheet 2 is again pressed by the hot roll 4 and the endless metal belt 5 while being moved therebetween. Accordingly, the sheet 2 is subjected to high-quality treatment for, for example, glazing or embossing.

In this case, the pressure to be applied onto the surface of the sheet 2 is 1 kg/cm$^2$ or more, preferably from 3 to 600 kg/m$^2$. The pressure may be controlled by adjusting (for example, increasing or decreasing) the distance between the cooling roll 7 located in the inside of the endless metal belt 5 and the inside heating roll 6 or by moving the hot roll 4 upwardly or downwardly to thereby impart a suitable tension to the sheet 2.

Figure 4:
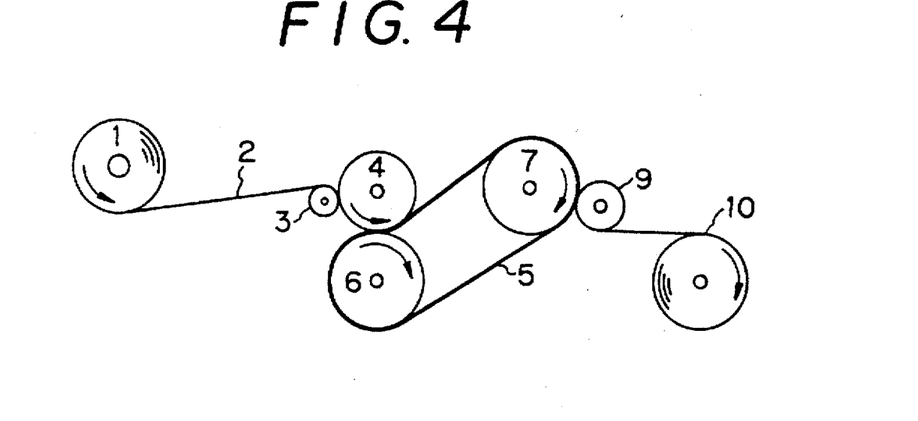
FIG. 4 is a schematic view showing the fourth embodiment of the device to be used in carrying out the first method of the present invention.

Alternatively, the pressure may be adjusted by the inside heating roll 6 located in the inside of the endless metal belt 5, as illustrated in FIG. 4.

Figure 5:
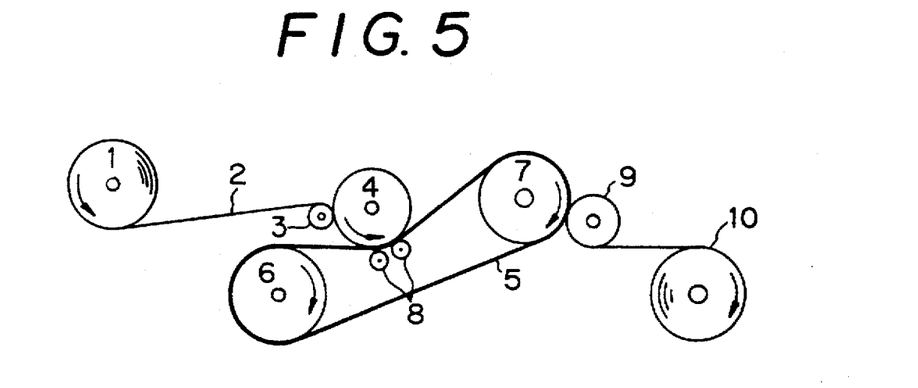
FIG. 5 is a schematic view showing the fifth embodiment of the device to be used in carrying out the first method of the present invention.

The provision of plural backup rolls 8, as illustrated in FIG. 5 enlarges the area of the sheet 2 being pressed and prolongs the pressing time, whereby the treatment of the sheet 2 may be made more uniform.

The backup rolls 8 may be either metal rolls or elastic rolls, and it is desired that they yield a line pressure of from 10 to 600 kg/cm.

The area of the sheet 2 to be pressed between the roll 4 and the belt 5 is determined in consideration of various conditions including the kind of the thermoplastic resin used (with respect to its thermal properties), the thickness of the thermoplastic resin sheet or film 2 being treated and the treating speed. In view of the strength and durability of the endless metal belt 5, the angle between the hot roll 4 and the endless metal belt 5 is limited to be at most about 180 degrees. By making the position of the inside cooling roll 7 variable, the angle between the belt 5 and the hot roll 4 may be freely adjusted. Such variable location is preferred.

In carrying out the first method of the present invention, it is desired that the pressure by the backup rolls 8 is initiated at the point at which the hot roll 4 is first brought into contact with the endless metal belt 5.

If the backup rolls 8 are located in the downstream from the point at which the hot roll 4 is first brought into contact with the endless metal belt 5, air would be introduced between the roll 4 and the belt 5. Such location is therefore unfavorable. This is because the introduction between them causes the uneven treatment of the sheet being treated so that a good treated sheet cannot be obtained.

The positions of the backup rolls 8 cannot be determined indiscriminately as concrete values, since they vary depending on the kind and thickness of the thermoplastic resin sheet or film 2 being treated and also the treating speed and temperature.

To glaze (smooth) the thermoplastic resin sheet or film 2 in accordance with the first method of the present invention, the outer surface of the hot roll 4 and that of the endless metal belt 5 must be mirror-finished.

In this case, the hot roll 4 and the endless metal belt 5 shall be mirror-finished to such a degree that they have a surface roughness of 3.0 μm or less, preferably 1.0 μm or less, more preferably 0.5 μm or less.

To emboss the sheet or film 2, the hot roll 4 may be an embossing roll or, alternatively, an embossing paper may be sandwiched between the sheet 2 being treated and the endless metal belt 5.

In the manner as mentioned above, the heated, untreated sheet 2 is introduced between the outer surface of the hot roll 4 and that of the endless metal belt 5, while the endless metal belt 5 is driven to move the sheet 2 along with it, whereby the untreated sheet 2 is pressed between the hot roll 4 and the endless metal belt 5 to be subjected to high-quality treatment, for example glazing or embossing. After the treatment, the sheet 2 is then released from the contact with the hot roll 4 and then with the endless metal belt 5 and, hence, it is removed from the roll 4 and the belt 5.

Precisely, the sheet 2 thus treated in the manner mentioned above is first released from the contact with the hot roll 4, then further moved along with the endless metal belt 5, and thereafter released also from the contact with the endless metal belt 5, whereby the treated sheet 2 is removed from them.

It is preferred that the treated sheet 2 is cooled with a cooling pressure roll 9 or the like prior to or simultaneously with the release of the sheet 2 from the endless metal belt 5. By removing the sheet 2 from the belt 5 after having been cooled, the surface of the treated sheet 2 may be prevented from being roughened due to the removal. In addition, the cooling pressure roll 9 also acts as a means for preventing the treated sheet 2 from being lifted up from the surface of the belt 5, whereby the sheet 2 may be cooled uniformly. Thus, the roll 9 has another advantage to augment the cooling efficiency with it.

The treated sheet 2 is then wound around the take-up roll 10 to be the final product. Prior to the winding step, the sheet 2 may be heat-treated (or annealed) again using a hot roll or the like. By the treatment, the treated sheet 2 may be prevented from curling. The heating temperature for the step varies, depending on the material of the sheet 2, but in general, it may be from 80° to 130° C., preferably from 110° to 130° C.

Figure 6:
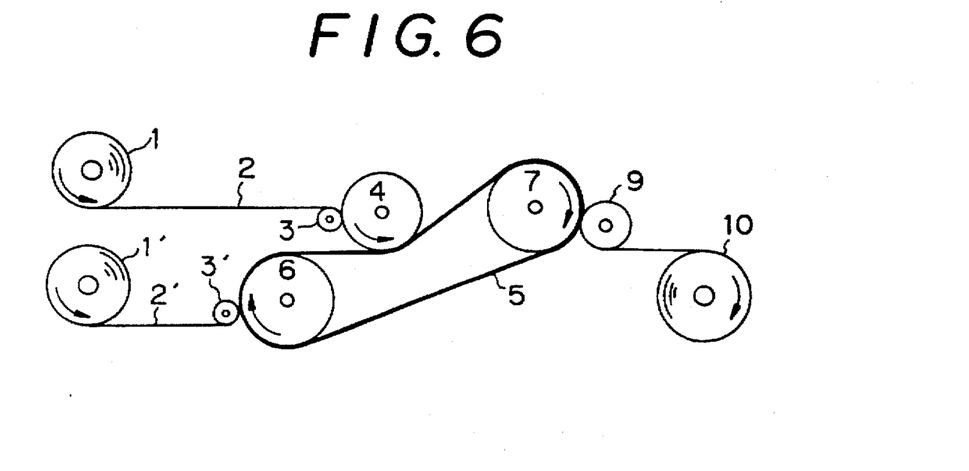
FIG. 6 is a schematic view showing one embodiment of the device to be used in carrying out the second method of the present invention.

The above-mentioned embodiment is to treat a single-layered sheet or film. Apart from this, however, the device illustrated in FIG. 6 may be used to produce a thick, two-layered laminate. FIG. 6 is a schematic view showing one embodiment of the device to be employed in carrying out the second method of the present invention.

Precisely, the second method of the present invention is to produce a laminate sheet or film of thermoplastic resins using two kinds of thermoplastic resin sheets or films each obtained by hot-melting a thermoplastic resin and then cooling it, in which one of the thermoplastic resin sheets or films is pressed against and adhered under heat to the outer surface of a heated roll while the other thermoplastic resin sheet or film is pressed against and adhered to the outer surface of a heated, endless metal belt. The two thermoplastic resins sheets or films are moved along with the roll and the belt, then the two thermoplastic resin sheets or films are inserted and pressed between the outer surface of the roll and the outer surface of the endless metal belt, and thereafter the resulting laminate is released from the contact with the roll and then from contact with the endless metal belt and is removed therefrom.

The second method is different from the above-mentioned first method in that one thermoplastic resin sheet or film is pressed against and adhered under heat to the outer surface of a heated roll, like in the first method mentioned above, while the other thermoplastic resin sheet or film is pressed against and adhered under heat to the outer surface of a heated, endless metal belt. Then they are both moved along with the roll and the belt, and thereafter they are combined together and are inserted and pressed between the outer surface of the roll and the outer surface of the endless metal belt. In the second method, one of the thermoplastic resin sheets or films shall be moved necessarily while it is kept pressed against and adhered under heat to the outer surface of the hot roll 4.

The second method of the present invention will be explained in detail hereunder. The second method uses two kinds of thermoplastic resin sheets or films.

For example, two untreated sheets 2 and 2' of the same kind or different kinds are let out from two letting-out rolls 1 and 1', respectively, these are preferably pre-heated with pre-heating rolls, and then one untreated sheet 2 is moved while being kept adhered to the outer surface of the hot roll 4 like in the first method mentioned above. The other untreated sheet 2' is moved while being kept adhered to the outer surface of the heated, endless metal belt 5.

The materials of the hot roll 4 and the endless metal belt 5 and the other conditions in the second method are the same as those in the first method mentioned above.

After the two untreated sheets 2 and 2' are moved while being kept adhered to the outer surface of the hot roll 4 and to the outer surface of the endless metal belt 5, respectively, as mentioned above, the two are combined together and are inserted between the outer surface of the hot roll 4 and the outer surface of the endless metal belt 5, or that is, into the contact point between the roll 4 and the belt 5, and thereafter these are treated in the same manner as in the first method mentioned above. Hence, a two-layered laminate of thermoplastic resins is produced by the second method.

Also in this case, the treated laminate may be glazed or embossed to be a two-layered laminate with higher quality.

Figure 7:
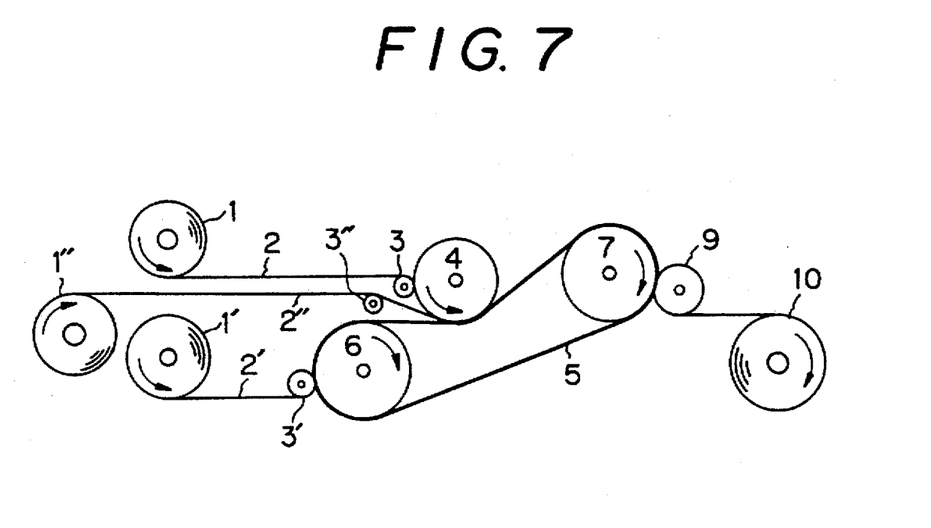
FIG. 7 is a schematic view showing one embodiment of the device to be used in carrying out the third method of the present invention.

In addition, the device as illustrated in FIG. 7 may also be employed in the present invention to obtain a three-layered or more multi-layered, thick laminate. FIG. 7 is a schematic view showing one embodiment of the device to be used in carrying out the third method of the present invention.

Precisely, the third method of the present invention is to produce a laminate sheet or film of thermoplastic resins using thermoplastic resin sheets or films of three kinds or more each obtained by hot-melting a thermoplastic resin and then cooling it, in which one of the thermoplastic resin sheets or films is pressed against and adhered under heat to the outer surface of a heated roll while another one also to the outer surface of a heated, endless metal belt, they are moved along with the roll and the belt while the last one or the remaining ones is/are inserted between the previous two thermoplastic resin sheets or films, then all these thermoplastic resin sheets or films are pressed together between the outer surface of the roll and the outer surface of the endless metal belt, and thereafter the resulting laminate is released from the contact with the roll and then from that with the endless metal belt to be removed therefrom.

The third method of the present invention will be explained in detail hereunder. The third method uses three kinds of thermoplastic resin sheets or films.

For example, three or more untreated sheets 2, 2', 2" and so on of the same kind or different kinds are let out from letting-out rolls 1, 1', 1" and so on, respectively, these are preferably pro-heated with pro-heating rolls, and then the first untreated sheet 2 of these is moved while being kept adhered to the outer surface of the hot roll 4 like in the first method mentioned above. The second untreated sheet 2' of these is moved while being kept adhered to the outer surface of the heated, endless metal belt 5. The other untreated sheet or sheets is/are inserted between the previous two thermoplastic resin sheets or films at the point near to the contact point at which the outer surface of the hot roll 4 is brought into contact with the outer surface of the endless metal belt 5, and thereafter all these thermoplastic resin sheets or films are pressed together between the outer surface of the hot roll 4 and the outer surface of the endless metal belt 5.

The materials of the hot roll 4 and the endless metal belt 5 and the other conditions in the third method are the same as those in the first and second methods mentioned above.

After the process of the third method, the pressed sheets or films are treated in the same manner as in the second method mentioned above, to finally obtain a multi-layered laminate of thermoplastic resins.

Also in this case, the treated laminate may be glazed or embossed to be a multi-layered laminate with higher quality, like in the second method mentioned above.

The thermoplastic resin sheets or films thus obtained by the methods of the present invention mentioned above have well-balanced properties. By smoothing (glazing) or embossing the sheets or films in accordance with the present invention, their quality is improved much and the sheets or films produced by the present invention have extremely high commercial values.

Three important features of the present invention are as follows:

(1) The sheet is moved while being adhered to the endless metal belt or the roll to avoid bubbles entering the gap between the sheet and the endless belt or the roll.

More particularly, to accomplish this object, the sheet is pressed to the outer peripheral surface of the roll or to the outer peripheral surface of the endless metal belt in a high temperature zone by a pressure roll at a predetermined press force, and is heat-adhered and moved.

In this case, if the sheet is introduced in a wedge form from the intermediate portion between the roll and the endless metal belt, the sheet is likely to come into contact with the roll or with the endless belt, the contact point of the sheet would then become unstable and bubbles would enter the sheet.

In contrast thereto, when the sheet is pressed to the outer peripheral surface of the roll or to the outer peripheral surface of the endless metal belt in the high temperature zone and is heat-adhered and moved as is the situation in the present invention, the intrusion of the bubbles can be prevented. In this case, when the pressure roll 3 made of an elastic material is used, the sheet can be adhered more uniformly and such means is preferred.

(2) The sheet is adhered to the endless metal belt or to the roll by raising the temperature of the endless metal belt or the roll to a temperature higher than the softening point of the thermoplastic resin which is employed.

It is of utmost importance that the sheet remains adhered to the endless metal belt or the roll, because bubbles will enter if the sheet leaves the endless metal belt or the roll.

(3) A temperature difference is provided between the roll 4 and the endless metal belt 5 at the portion at which the sheet 2 is sandwiched between them. A temperature is maintained which is higher than the softening point of the thermoplastic resin which is utilized so that the sheet 2 adheres to the higher temperature side.

In the present invention, in the high temperature zone, the temperature of the endless metal belt 5 is set to be higher than the temperature of the roll 4 (to the higher temperature side) so that the sheet 2 adheres to the endless metal belt 5.

If the sheet adheres to the roll in this case, it becomes difficult to peel the sheet because the temperature of the roll is constant.

In the present invention, to peel the sheet from the endless metal belt, the endless metal belt is cooled in a low temperature zone. Therefore, the sheet can be easily peeled while maintaining its luster.

The bonding of the sheet to the metal surface (such as the metal surface of the endless metal belt) occurs at a temperature higher than the temperature of the thermoplastic resin which is used (for example, not lower than 120° C. for polypropylene), and the bonding force becomes higher when the pressing force is greater or the temperature is higher.

Therefore, when the sheet is sandwiched and pressed between metal surfaces (endless metal belt and roll) heated to a temperature higher than the softening point, the sheet remains on the side having a relatively higher temperature, before it is peeled.

Accordingly, the present invention provides a temperature difference between the roll and the endless metal belt, both of which are heated to a temperature higher than the softening point of the thermoplastic resin which is used, and the temperature of the endless metal belt is set at a higher temperature so that the sheet remains on the endless metal belt.

The heated endless metal belt causes the sheet to attain a high temperature so as to adhere the sheet to the endless metal belt. To peel the sheet, the temperature is lowered to a temperature which is lower than the softening point of the thermoplastic resin which is used so as to reduce the bonding strength.

The temperature difference between the roll 4 and the endless metal belt 5 may be at least 1° C. (see the Examples hereinbelow). If the temperature difference is less than 1° C., the sheet peels-off from the endless metal belt.

The peel mechanism of the sheet is explained as follows.

According to a method which uses only a roll, the entire periphery of the roll would have the same temperature. Therefore, there are only the two cases, that is, the case where the sheet adheres to the roll and the case where it does not, and the adhering sheet cannot be peeled.

In contrast thereto, the present invention uses an endless metal belt in addition to the roll. The following steps occur in the present invention: the endless metal belt is heated from the inside surface thereof to a temperature higher than the softening point of the thermoplastic resin which is used, the sheet thus adheres to the endless metal belt, the sheet is moved, the sheet is then cooled from the inside surface of the endless metal belt to a temperature less than the softening point of the thermoplastic resin and thus the sheet can be peeled from the endless metal belt.

The present invention will be explained in more detail by means of the following examples, which, however, are not intended to restrict the scope of the present invention.

EXAMPLE 1

(Surface Smoothing):

Using the device illustrated in FIG. 5, a thermoplastic resin sheet was glazed (smoothed) in the manner mentioned below.

As the untreated sheet 2, a non-stretched polypropylene sheet having an inside haze of 5%, a total haze of 15%, a surface gloss of 90% and a thickness of 300 μm was used. Regarding the treating conditions, the temperature of the hot roll 4 was at 130° C. The temperature of the at the portion thereof where the sheet 2 is sandwiched between the endless metal belt 5 and the heating roll 4 (high temperature zone) was set at 145° C. The temperature of the heating roll 4 was 130° C. The temperature of the internal heating roll 6 was 180° C. The surface temperature of the endless metal belt 5 at the portion thereof in contract with the internal cooling roll 7 (which was cooled by water to a temperature of 80° C.) (low temperature zone) was 80° C. The cooling pressure roll 9 was cooled naturally. The surface roughness of the hot roll 4 was 0.2 μm, the surface roughness of the endless metal belt 5 was 0.2 μm, the plane pressure between the hot roll 4 and the endless metal belt 5 was 3 kg/cm², the line pressure between the hot roll 4 and the backup roll 8 was 50 kg/cm, and the speed of the sheet being treated was 40 m/min.

The untreated sheet 2 mentioned above was moved while being kept adhered to the outer surface of the hot roll 4 under the conditions mentioned above, then inserted and pressed between the outer surface of the hot roll 4 and the outer surface of the endless metal belt 5, and thereafter it was released from the contact with the hot roll 4 and then from the contact with the endless metal belt 5 to be removed from them. Hence, a treated sheet was obtained.

The treated sheet had a thickness of 298 μm, an inside haze of 1%, a total haze of 2%, and a surface gloss of 140%. The both surfaces of the treated sheet were satisfactorily glossy, and the sheet thus obtained had good transparency.

EXAMPLE 2

(Embossing)

The same process as in Example 1 was repeated, except that an embossing roll was used as the hot roll 4, that the temperature of the hot roll 4 was at 140° C. and that the surface temperature of the endless metal belt 5 at the portion thereof at which the sheet 2 is sandwiched between the endless metal belt 5 and the heating roll 4 was set at 150° C. After the process, a good embossed sheet was obtained. In this case, the sheet 2 did not leave the endless metal belt 5 before the temperature of the sheet 2 dropped to 120° C. or below.

EXAMPLE 3

(Surface Smoothing with Lamination)

Using the device illustrated in FIG. 6, lamination of thermoplastic resin sheets with smoothing the surfaces of the resulting laminate was carried out.

Precisely, non-stretched polypropylene sheets each having an inside haze of 5%, a total haze of 15%, a surface gloss of 90% and a thickness of 300 μm were used as the untreated sheets 2 and 2'.

The sheet 2 was brought into pressure contact with the heating roll 4 having a surface temperature of 140° C. by the pressure roll 3. At the same time, the sheet 2' was brought into pressure-contact with the endless metal belt 5 having a surface temperature of 150° C. by another pressure roll 3'. The temperature of the internal heating roll 6 was 185° C. The surface temperature of the endless metal belt 5 was 80° C. at the portion at which it was in contact with the internal cooling roll 7 (cooled by water to 80° C.). The cooling pressure roll 9 was cooled naturally. The surface roughness of the hot roll 4 was 0.2 μm, the surface roughness of the endless metal belt 5 was 0.2 μm, the plane pressure between the hot roll 4 and the endless metal belt 5 was 3 kg/cm$^2$, the line pressure between the hot roll 4 and the backup roll 8 was 50 kg/cm, and the speed of the sheets being treated was 40 m/min. Under the conditions, the two sheets were laminated together.

In this case, the laminated sheet (2/2') did not leave the endless metal belt 5 before the temperature of the sheet dropped to 120° C. or below.

As a result, a wrinkle-free smooth sheet having a thickness of 595 μm was obtained, and it had good surfaces. Though having tried to measure the lamination strength in the laminated site of the laminate sheet thus obtained, peeling was impossible.

EXAMPLE 4

Example 1 was followed with the exception that the temperature of the heating roll 4 was 141° C. and the temperature of the endless metal belt 5 was set to 142° C. at the portion which the sheet 2 is sandwiched between the endless metal belt 5 and the heating roll 4.

In this case, the sheet 2 did not leave the endless metal belt 5.

The resulting sheet had a thickness of 298 μm and had excellent gloss on both surfaces. Therefore, a sheet having an excellent transparency was obtained.

EXAMPLE 5

In accordance with Example 1 hereinabove, the following adhesion and peel operations were carried out using the device depicted in FIG. 2.

A non-stretched polypropylene sheet 2 having an internal haze of 5%, a total haze of 15%, surface gloss of 90%, and a thickness of 300 μm came into contact with the pressure roll 3, and was then adhered to the endless metal belt 5 heated by the internal heating roll 6 (temperature: 180° C.) and the sheet 2 was moved while it adhered to the endless metal belt 5. In this case, the surface temperature of the endless metal belt was 125° C. at the portion at which the sheet 2 was sandwiched between the endless metal belt 5 (which at one end thereof was supported by the internal heating roll 6 and at the opposite end thereof was supported by the pressure roll 3). The surface temperature of the endless metal belt (125° C.) was higher than the softening point (about 120° C. of the resin used. The surface temperature of the endless metal belt at subsequent portions other than this portion was maintained at 140° C. by the internal heating roll 6. At the portion at which the sheet 2 was disposed between the endless metal belt 5 and the heating roll 4, the surface temperature of the endless metal belt 5 was 140° C., while the temperature of the heating roll 4 was 135° C.

Accordingly, the sheet 2 adhered to the higher temperature side, that is, to the endless metal belt 5. After leaving the heating roll 4, the endless metal belt 5 was cooled by the internal cooling roll 7, and the surface temperature of the endless metal belt 5 was 80° C. at the portion at which it was in contact with the internal cooling roll 7. Since this surface temperature of the endless metal belt was less than the softening point of the resin used, it was possible to peel the sheet 2 from the endless metal belt 5. The sheet was then wound on the cooling pressure roll 9 and was taken up on the take-up roll 10. Since the temperature of the cooling pressure roll 9 was 80° C. in this case, a temperature higher than 80° C. is permissible so long as it is less than the softening point of the thermoplastic resin used.

The pressing force of the pressure roll 3 was 20 kg/cm (line pressure) and the pressing force between the heating roll 4 and the endless metal belt 5 was 2 kg/cm$^2$ (plane pressure).

After the treatment, a sheet was obtained having a thickness of 298 μm, an internal haze of 1%, a total haze of 2%, a surface gloss of 140%, excellent luster on both surfaces and excellent transparency.

COMPARATIVE EXAMPLE 1

An experiment was carried out under the same conditions as in Example 1, with the exception that the temperature of the heating roll 4 was changed to 145° C. and the temperature of the endless metal belt 5 was set to 140° C. at the portion at which the sheet 2 was sandwiched between the endless metal belt 5 and the heating roll 4.

In this case, the sheet 2 floated up (separated) from the endless metal belt 5 and a flat sheet was not obtained.

In accordance with the methods of the present invention that have been explained in detail hereinabove, non-stretched thermoplastic resin sheets, films and laminates may be produced by high-quality and high-degree treatments for smoothing (glazing) or embossing their surfaces or for laminating two or more sheets or films with smoothing the resulting laminate.

In addition, in accordance with the methods of the present invention, such sheets, films and laminates are efficiently produced by simple operation.

Where untreated thermoplastic resin sheets or films having high transparency are treated in accordance with the methods of the present invention, thick sheets or films having improved transparency and surface gloss may be obtained.

Since the methods of the present invention can be carried out, using small and simple devices, they are economical. In addition, they may be carried out by simple operation, their productivity is extremely excellent.

Accordingly, the thermoplastic resin sheets, films and laminates to be obtained by the methods of the present invention are suitable for wrapping foods, medicines, etc.

While the invention has been described in detail and with reference to specific embodiments thereof, it will be apparent to one skilled in the art that various changes and modifications can be made therein without departing from the spirit and scope thereof.

What is claimed is:

1. A method for producing a thermoplastic resin sheet or film comprising:
   (a) hot-melting and then cooling a thermoplastic resin to provide a thermoplastic resin sheet or film,
   (b) providing an external heated roll, the external heated roll being heated to a temperature higher than a softening point of the thermoplastic resin sheet or film and providing a moving, heated, endless metal belt, the moving, heated, endless metal belt being disposed at one end around a moving, internal heating roll and at an opposite end thereof around a moving, internal cooling roll, the internal heating roll heating the moving, heated, endless metal belt to a temperature higher than the softening point of the thermoplastic resin and higher than the temperature of the external heating roll to provide a high temperature zone, the external heating roll being in contact with the moving, heated, endless metal belt, (c) moving the resin sheet or film from step (a) so that the resin sheet or film presses against an outer surface of the external heated roll or presses against an outer surface of the moving, heated, endless metal belt to thermally adhere the thermoplastic resin sheet or film to the external heated roll or to the moving, heated, endless metal belt, (d) moving the resin sheet or film along with the external heated roll or the moving, heated, endless metal belt into said high temperature zone so that the resin sheet or film is pressed between the outer surface of the external heated roll and the outer surface of the moving, heated, endless metal belt in said high temperature zone, (e) releasing the thermoplastic resin sheet or film from contact with the external heated roll in said high temperature zone, (f) releasing the thermoplastic resin sheet or film from contact with the moving, heated, endless metal belt in a low temperature zone adjacent to the internal cooling roll and (g) peeling the thermoplastic resin sheet or film from the moving, heated, endless metal belt.

2. The method as claimed in claim 1, in which the thermoplastic resin sheet or film is pressed under a pressure of 1 kg/cm² or higher.

3. The method as claimed in claim 1, in which the external hot roll and the moving heated, endless metal belt are maintained at a temperature such that the thermoplastic resin sheet or film is at a temperature of 120° C. to 350° C.

4. The method as claimed in claim 1, in which the moving, heated, endless metal belt moves at a speed of 10 to 40 m/minute.

5. The method as claimed in claim 1, in which the external heated roll is at a temperature of 130° C. and the moving, heated, endless metal belt is at a temperature of 145° C.

6. The method as claimed in claim 1, in which the external heated roll is at a temperature of 140° C. and the moving, heated, endless metal belt is at a temperature of 150° C.

7. The method as claimed in claim 1, wherein there is a temperature difference of at least 1° C. in the high temperature zone between the moving, endless metal belt and the external heated roll.

8. A method for producing a laminate sheet or film made of two separate thermoplastic resin sheets or films comprising:

(a) hot-melting and then cooling a first thermoplastic resin and a second thermoplastic resin to respectively form a first thermoplastic resin sheet or film and a second thermoplastic resin sheet or film, (b) providing a moving, external heated roll, the moving, external heated roll being heated to a temperature higher than a softening point of the first thermoplastic resin sheet or film, (c) providing a moving, heated, endless metal belt, the moving, heated endless metal belt being disposed at one end around a moving internal heated roll and at an opposite end thereof around a moving internal cooling roll, the internal heated roll heating the moving, heated endless metal belt to a temperature higher than the softening point of the first and second thermoplastic resins and higher than the temperature of the moving, external heated roll to provide a high temperature zone, (d) moving said first thermoplastic resin sheet or film from step (a) to said high temperature zone so that said first thermoplastic resin sheet or film is pressed by and adhered to an outer surface of the moving, external heated roll, (e) moving said second thermoplastic resin sheet or film from step (a) to be pressed by and adhered to an outer surface of the moving, heated, endless metal belt, (f) moving each of said first thermoplastic resin sheet or film and said second thermoplastic resin sheet or film respectively along with the external heated roll and the moving, heated, endless metal belt, (g) moving said first thermoplastic resin sheet or film and said second thermoplastic resin sheet or film between the outer surface of the moving, external heated roll and the outer surface of the moving, heated, endless metal belt, to press together said first thermoplastic resin sheet or film and said second thermoplastic resin sheet or film and to form a laminate, (h) releasing the laminate from contact with the moving, external heated roll in said high temperature zone, (i) releasing the laminate from contact with the moving, heated, endless metal belt in a low temperature zone adjacent to the internal cooling roll, and (j) removing the laminate from the moving, heated, endless metal belt.

9. The method as claimed in claim 8, in which the first and second thermoplastic resin sheets or films are pressed under a pressure of 1 kg/cm² or higher.

10. The method as claimed in claim 9, in which the thermoplastic resin is selected from the group consisting of polyethylene, polypropylene, polyethylene terephthalate, polystyrene, polycarbonate, polyvinyl chloride and polymethyl methacrylate.

11. The method as claimed in claim 10, in which the thermoplastic resin sheet or film has a thickness of 0.1 to 2 mm.

12. The method as claimed in claim 10, in which the thermoplastic resin sheet or film has a thickness of 0.2 to 1.0 mm.

13. The method as claimed in claim 12, in which the thermoplastic resin sheet or film is pressed under a pressure of 3 to 600 kg/m².

14. The method as claimed in claim 9, in which the external heated roll and the moving, heated, endless metal belt are each independently maintained at a temperature such that the first and second thermoplastic resin sheets or films are at a temperature of 120° C. to 350° C.; and the moving, heated, endless metal belt moves at a speed of 10 to 40 m/minute.

15. The method as claimed in claim 9, in which each of the first and second thermoplastic resins are selected from the group consisting of polyethylene, polypropylene, polyethylene terephthalate, polystyrene, polycarbonate, polyvinyl chloride and polymethyl methacrylate; and the first and second thermoplastic resin sheets or films each having a thickness of 0.1 to 2 mm.

16. The method as claimed in claim 8, wherein there is a temperature difference of at least 1° C. in the high temperature zone between the moving, heated, endless metal belt and the external heated roll.

17. A method for producing a laminate sheet or film made of at least first, second and third separate thermoplastic resin sheets or films comprising:
- (a) hot-melting and then cooling each of first, second and third separate thermoplastic resins to respectively form first, second and third separate thermoplastic resin sheets or films,
- (b) providing a moving, external heated roll, the moving, external heated roll being heated to a temperature higher than a softening point of the first thermoplastic resin sheet or film, and providing a moving, endless metal belt which is disposed at one end around a moving, internal heating roll and at an opposite end thereof around a moving, internal cooling roll, the internal heating roll heating the moving, endless metal belt to a temperature higher than the softening point of the thermoplastic resins and higher than the temperature of the moving, external heated roll to provide a high temperature zone,
- (c) moving said first thermoplastic resin sheet or film from step (a) to said high temperature zone so that said first thermoplastic resin sheet or film is pressed by and adhered to an outer surface of the moving external heated roll,
- (d) moving said second thermoplastic resin sheet or film from step (a) so that said second thermoplastic resin sheet or film is pressed by and adhered to the outer surface of the moving, heated, endless metal belt,
- (e) moving each of said first thermoplastic resin sheet or film and said second thermoplastic resin sheet or film respectively along with the moving, external heated roll and the moving, heated, endless metal belt,
- (f) inserting said third thermoplastic resin sheet or film between said first thermoplastic resin sheet or film and said second thermoplastic resin sheet or film,
- (g) optionally inserting at least one further thermoplastic resin sheet or film between said first thermoplastic resin sheet or film and said second thermoplastic resin sheet or film,
- (h) pressing together all of said thermoplastic resin sheets or films between the outer surface of the moving, external heated roll and the outer surface of the moving, heated, endless metal belt to form a laminate,
- (i) releasing the laminate from contact with the moving, external heated roll in said high temperature zone,
- (j) releasing the laminate from contact with the moving, heated, endless metal belt in a low temperature zone adjacent to the internal cooling roll, and
- (k) removing the laminate from the moving, heated, endless metal belt.

18. The method as claimed in claim 17, in which all the thermoplastic resin sheets or films are pressed under a pressure of 1 kg/cm² or higher.

19. The method as claimed in claim 18, in which the thermoplastic resins are selected from the group consisting of polyethylene, polypropylene, polyethylene terephthalate, polystyrene, polycarbonate, polyvinyl chloride and polymethyl methacrylate; and the thermoplastic resin sheets or films each have a thickness of 0.1 to 2 mm.

20. The method as claimed in claim 18, in which the external heated roll and the moving, heated, endless metal belt are each independently maintained at a temperature such that the thermoplastic resin sheets or films are at a temperature of 120° C. to 350° C.; and the moving, heated, endless metal belt moves at a speed of 10 to 40 m/minute.

21. The method as claimed in claim 17, wherein there is a temperature difference of at least 1° C. in the high temperature zone between the moving, heated, endless metal belt and the external heated roll.

* * * * *